United States Patent
Oliver et al.

(10) Patent No.: US 9,602,339 B2
(45) Date of Patent: *Mar. 21, 2017

(54) SYSTEM AND METHOD FOR SUPPORTING A SERVER-SIDE EVENT MODEL IN A DISTRIBUTED DATA GRID

(71) Applicant: Oracle International Corporation, Redwood Shores, CA (US)

(72) Inventors: Brian Oliver, Acton, MA (US); Noah Arliss, Lexington, MA (US); Gene Gleyzer, Lexington, MA (US); Robert H Lee, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,857

(22) Filed: Apr. 19, 2016

(65) Prior Publication Data
US 2016/0234057 A1 Aug. 11, 2016

Related U.S. Application Data

(63) Continuation of application No. 13/462,719, filed on May 2, 2012, now Pat. No. 9,348,668.
(Continued)

(51) Int. Cl.
*H04L 12/24* (2006.01)
*H04L 29/08* (2006.01)
(Continued)

(52) U.S. Cl.
CPC .......... *H04L 41/0631* (2013.01); *G06F 9/542* (2013.01); *H04L 67/1097* (2013.01);
(Continued)

(58) Field of Classification Search
None
See application file for complete search history.

(56) References Cited

U.S. PATENT DOCUMENTS 5,625,821 A    4/1997  Record
6,512,519 B1   1/2003  Arsenault
(Continued)

FOREIGN PATENT DOCUMENTS

JP    2006146789    6/2006

OTHER PUBLICATIONS

European Patent Office, Extended European Search Report Dated Jul. 26, 2016 for Application No. 12773156.0-1954 /2756430 PCT/US2012/055586, 9 Pages.
(Continued)

*Primary Examiner* — Umut Onat
(74) *Attorney, Agent, or Firm* — Tucker Ellis LLP

(57) ABSTRACT

A server-side event model provides a general-purpose event framework which simplifies the server-side programming model in a distributed data grid storing data partitions distributed throughout a cluster of nodes. A system provides event interceptors which handle events associated with operations and maps the event interceptors to event dispatchers placed in the cluster. Advantageously, the system supports handling critical path events without the need for interactions from the client-side thereby avoiding unnecessary delays waiting for client responses. Additionally, the system can defer completion of an operation in the distributed data grid pending completion of event handling by an event interceptor. The system enables the data grid to employ more types of events and define different event interceptors for handling the events while avoiding client interaction overhead.

20 Claims, 6 Drawing Sheets

Related U.S. Application Data

(60) Provisional application No. 61/535,238, filed on Sep. 15, 2011.

(51) Int. Cl.
*H04L 29/06* (2006.01)
*G06F 9/54* (2006.01)

(52) U.S. Cl.
CPC .............. *H04L 67/16* (2013.01); *H04L 67/42* (2013.01); *G06F 2209/542* (2013.01)

(56) References Cited

U.S. PATENT DOCUMENTS

| | | | |
|---|---|---|---|
| 6,681,154 | B2 | 1/2004 | Nierlich |
| 7,644,087 | B2 | 1/2010 | Barkai |
| 7,730,446 | B2 | 6/2010 | Anonsen |
| 7,861,213 | B2 | 12/2010 | Wang |
| 8,453,149 | B2 * | 5/2013 | Ben Yehuda ....... G06F 9/45533 718/1 |
| 8,458,695 | B2 * | 6/2013 | Fitzgerald ............... G06F 9/455 713/164 |
| 8,539,171 | B2 | 9/2013 | Shafi |
| 8,584,136 | B2 | 11/2013 | Goetz |
| 2003/0050983 | A1 | 3/2003 | Johnson |
| 2004/0181775 | A1 * | 9/2004 | Anonsen ................ G06Q 10/10 717/104 |
| 2009/0252175 | A1 | 10/2009 | Dempo |
| 2009/0292877 | A1 | 11/2009 | Piper |
| 2010/0235118 | A1 | 9/2010 | Moore |

OTHER PUBLICATIONS

European Patent Office, International Searching Authority, International Search Report and Written Opinion Dated Mar. 23, 2013 for International Application No. PCT/US2012/055586, 10 Pages.

State Intellectual Property Office of the Peoples Republic of China, Search Report and First Office Actioin Dated May 5, 2016 for Chinese Application No. 201280044779.6, 23 Pages.

Darrell Brunsch et al., "Designing an Efficient and Scalable Server-Side Asynchrony Model for Cobra" Aug. 2001, 7 Pages Retrieved May 31, 2016 From <http://www.cs.wustl.edu/~schmidt/PDF/AMH.pdf>.

Pietzuch, Peter R. et al., "Hermes: A Distributed Event-Bsaed Middleware Architecture" Proceedings of the 22nd International Conference on Distributed Computing Systems Workshops © 2002 IEEE, 8 Pages.

Pietzuch, Peter R., "Hermes: A Scalable Event-Based Middleware" Technical Report, No. 590, University of Cambridge Computer Laboratory, © 2004, 180 Pages.

* cited by examiner

SYSTEM AND METHOD FOR SUPPORTING A SERVER-SIDE EVENT MODEL IN A DISTRIBUTED DATA GRID

CLAIM OF PRIORITY

This application is a continuation of U.S. patent application Ser. No. 13/462,719, filed May 2, 2012, entitled SYSTEM AND METHOD FOR SUPPORTING A SERVER-SIDE EVENT MODEL IN A DISTRIBUTED DATA GRID", now U.S. Pat. No. 9,348,668 issued on May 24, 2016, and which claims the benefit of priority on U.S. Provisional Patent Application No. 61/535,238, entitled "UNIFIED EVENT MODEL FOR USE IN A DISTRIBUTED DATA GRID" filed Sep. 15, 2011, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates to data caching and accessing techniques in distributed computing environments and more particularly to supporting a server-side event model in a distributed data grid.

BACKGROUND

In the context of distributed data management systems, event models are sometimes used to provide information about data changes. In a typical example, a client can register a listener to listen for a particular event on a piece of data. When the data change, an event is generated and the client is informed of the event by way of a listener.

One limitation with this approach is that it is asynchronous in the sense that the event has already occurred, meaning that the client has no effective means to affect the data change because the client is informed after the event has already occurred. Thus, to make a change to the event, the client may be forced to perform a whole new transaction to make that change. Another limitation is often the size and the scalability of the solution because the client is registered to listen to all events in what is a frequently very large data set.

Additionally, various extensible hooks with different semantics and idiosyncratic forms of configuration are often presented to users as separate features. There can be little documentation about how these hooks relate to one another and it's not always clear which one is the most appropriate to use. In addition, the programming model varies for each hook, many of which have unique limitations.

A new solution is thus desirable, one which would address or resolve the above limitations as well as provide a number of other advantages.

SUMMARY

Described herein is a system and method that can provide a server-side event model in a distributed data grid with a plurality of cluster nodes storing data partitions distributed throughout the cluster, each cluster node being responsible for a set of partitions. The system can map one or more event interceptors to an event dispatcher placed in the cluster. The one or more event interceptors can handle at least one event dispatched from the event dispatcher, wherein the at least one event is associated with an operation in the distributed data grid. The system can defer completion of the operation in the distributed data grid pending completion of the handling of the at least one event by said one or more event interceptors.

DETAILED DESCRIPTION

Figure 1:
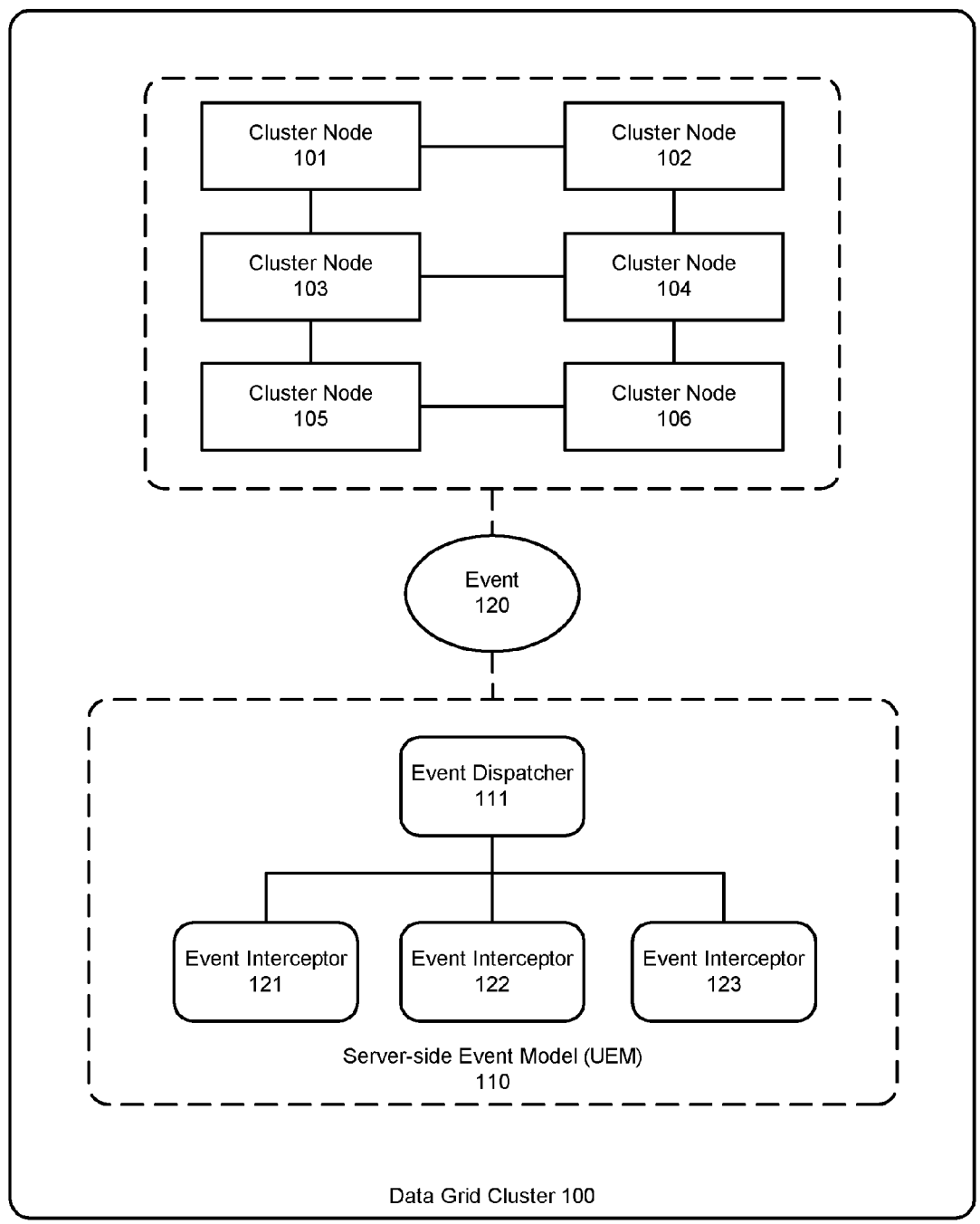
FIG. 1 shows an illustration of a distributed data grid that supports a server-side event model, in accordance with an embodiment of the invention.

In accordance with various embodiments, a server-side event model can be provided in a distributed data grid with a plurality of cluster nodes storing data partitions distributed throughout the cluster, each cluster node being responsible for a set of partitions. One exemplary distributed data grid is an Oracle® Coherence data grid. The system can map one or more event interceptors to an event dispatcher placed in the cluster. The one or more event interceptors can handle at least one event dispatched from the event dispatcher, wherein the at least one event is associated with an operation in the distributed data grid. The system can defer completion of the operation in the distributed data grid pending completion of the handling of the at least one event by said one or more event interceptors.

In accordance with an embodiment, events can be raised in the critical path of performing sever-side functionality in a distributed data grid. The data grid can perform passive computation only when certain data changes. The data grid supports handling such events without the need of interactions from the client-side, in order to avoid injecting the client into the critical path. In a data grid, it is prefer not to allow the client to be involved in the critical path, since it can cause unnecessary delays to wait for client responses.

In accordance with an embodiment, handling the events in the critical path can be beneficial when the data grid is dealing with a large column of data without the overhead of client interaction. Thus, the data grid can employ more types of events and define different event listeners or interceptors for handling the events. Additionally, the performing of the operations on the data in the data grid is deferred pending the completion of the handling of the events dispatched in the critical path.

Server-Side Event Model

In accordance with an embodiment, a server-side event model, such as the Unified Event Model (UEM) in Coherence, is a general-purpose event framework that can be used to simplify the server-side programming model in a distributed data grid.

The server-side event model can provide a consistent semantic model, uniform configuration, and broaden the flexibility for extending the server-side programming capability of the distributed data grid. Events can have clearly defined semantics that formalizes what operations may be performed from within the corresponding event handler. These events can provide "one-stop shopping" for extensibility within a distributed data grid cluster. Users can quickly survey what events are available, and understand their semantics.

Using the server-side event model, the distributed data grid can provide a server-side programming model instead of a wide range of extensible hooks. For example, in Coherence, end users can use this server-side programming model to insert custom logic for: Backing Map Listeners, Partition Listeners, Cache Loaders/Cache Stores, Triggers, Transformers, Entry Processors, Aggregators, and Custom Backing Maps. Thus, the distributed data grid can avoid different problems associated with using extensible hooks.

FIG. 1 shows an illustration of a distributed data grid that supports a server-side event model, in accordance with an embodiment of the invention. As shown in FIG. 1, a server-side event model 110 can be provided in a data grid cluster 100 that includes multiple inter-connected cluster nodes 101-106. The server-side event model includes at least one event dispatcher 111, which can be mapped to one or more event interceptors 121-123. The event interceptors are responsible for receiving and handling an event 120 raised by the server-side event model framework. The event dispatcher, which is located within the data grid cluster, can be responsible for triggering the event interceptors for the events that the event interceptors are registered for.

In accordance with an embodiment, an event interceptor can be responsible for receiving and handling an event raised by the server-side event model framework. Event interceptors can also be chained together when more than one event interceptors are registered for the same events. Thus, multiple interceptors can be executed in the context of a single event.

In the example of Coherence, an event interceptor interface can be provided to an end user to implement logics for handling events. A sample interface, as shown below in Listing 1, can have two methods: one method for handling events and another method that is used as a part of the registration process.

Listing 1

```
/**
 * An {@link EventInterceptor} provides an implementation that is capable of receiving and
 * processing an {@link Event}.
 *
 * While it's possible for {@link EventInterceptor} instances to be reused, they themselves
 * are <strong>immutable</strong> or thread-safe so that if an instance is scheduled for
 * execution by multiple threads concurrently, their state is not corrupted.
 *
 */
public interface EventInterceptor
    {
    /**
     * Perform necessary processing of the provided {@link Event}.
     *
     * @param event the {@link Event} to be processed
     */
    void onEvent(Event event);
    /**
     * {@link EventInterceptor}s are responsible for determining whether they are
     * registered with an {@link EventDispatcher} or not. The introduceDispatcher method is
     * responsible for calling the {@link EventDispatcher#addEventInterceptor(String,
     * EventInterceptor)} method.
     *
     * @param dispatcher the dispatcher to introduce this {@link EventInterceptor} to.
     */
    void introduceEventDispatcher(EventDispatcher dispatcher);
    }
```

In accordance with an embodiment, event dispatchers are specialized objects that can be tightly bound to the context in which the events need to be raised. There can be specialized event dispatcher instances located in key places within a distributed data grid.

In Coherence, an event dispatcher can be associated with a PartitionedService to handle StorageEvents. As shown below in Listing 2, in order to facilitate optimized event interceptor registration, event dispatchers can have a well-defined set of events that the event dispatchers are responsible for dispatching.

operation in the distributed data grid. Then, at step 202, said one or more event interceptors can handle the at least one event that is dispatched from the event dispatcher to said one or more event interceptors. Finally, at step 203, the distributed data grid defers the completion of the operation pending completion of the handling of the at least one event by said one or more event interceptors.

Event Hierarchy

In accordance with an embodiment, an event represents an observable occurrence of some operation performed within a distributed data grid. There can be different types of events Listing 2

```
/**
 * An {@link EventDispatcher} is responsible for dispatching {@link Event}s to {@link
 * EventInterceptor}s for processing.
 *
 */
public interface EventDispatcher
    {
    /**
     * Adds the specified {@link EventInterceptor} to be used to select and process {@link Event}s
     * dispatched by the {@link #dispatchEvent(EventContext, Event)} method.
     *
     * @param sIdentifier     the name of the {@link EventInterceptor} to add .
     * @param eventInterceptor the {@link EventInterceptor} to add.
     * @param setTypes        the event types this {@link EventInterceptor} is interested in. .
     * @param fFirst          whether the {@link EventIntercepter} should be added to the
     *                        head or the tail of the dispatcher's interceptor chain.
     */
    void addEventInterceptor(String sIdentifier, EventInterceptor eventInterceptor, Set<Integer>
setTypes, boolean fFirst);
    /**
     * Remove the specified {@link EventInterceptor} for processing {@link Event}s.
     *
     * @param sIdentifier the name of the {@link EventInterceptor} to remove.
     */
    void removeEventInterceptor(String sIdentifier);
    /**
     * Returns true if {@link EventDispatcher} is enabled to dispatch {@link Event}s of the type
     * specified.
     *
     * @param nEventType the event type to check against.
     *
     * @return true if the dispatcher is enabled to dispatch {@link Event}s of nEventType
     */
    boolean isEnabled(int nEventType);
    /**
     * Returns the set of supported {@link Event} types for this dispatcher.
     *
     * @return the set of supported {@link Event} types for this dispatcher
     */
    Set<Integer> getSupportedTypes( );
    }
```

Additionally, the event dispatchers can expose statistics about their performance, e.g. via JMX, to give both developers and the operations teams insight into how the server-side event model is behaving in the system. Such information includes the names of all registered event interceptors, the event types of interest to each registered event interceptor, the number of events that have been raised/processed, the number of exceptions that have been thrown, the average time spent handling events, the longest time spent handling an event, and the name of event interceptor that took the longest time during that event.

Figure 2:
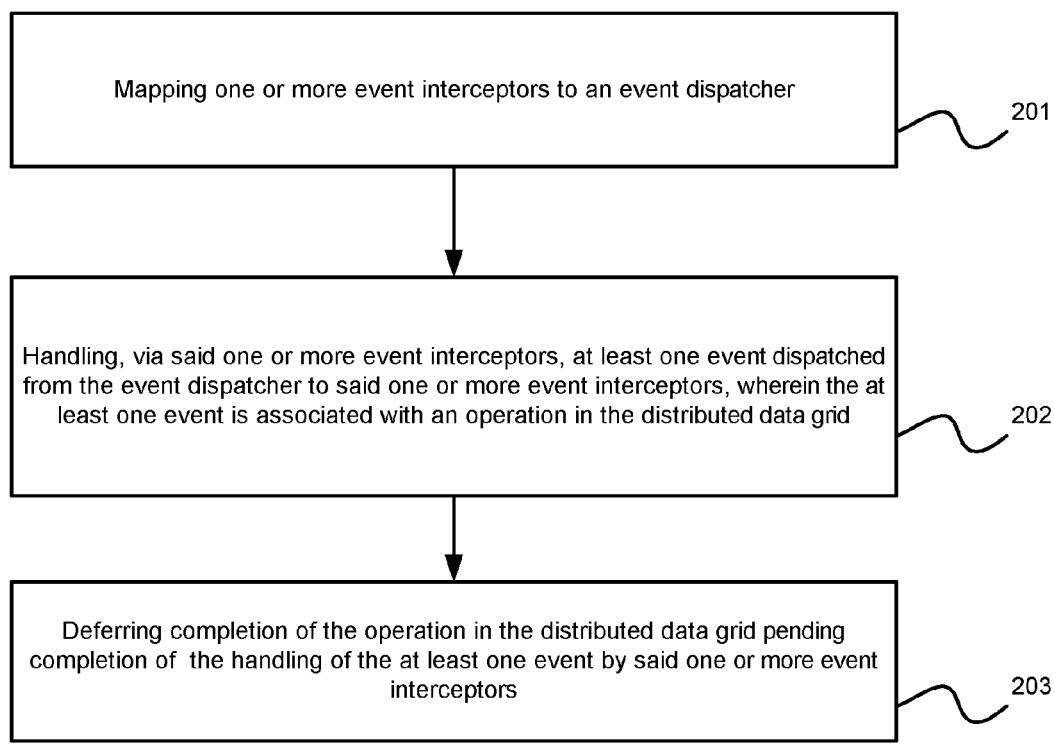
FIG. 2 shows an illustration of a flow chart for providing a server-side event model in a distributed data grid, in accordance with an embodiment of the invention.

FIG. 2 shows an illustration of a flow chart for providing a server-side event model in a distributed data grid, in accordance with an embodiment of the invention. As shown in FIG. 2, at step 201, one or more event interceptors can be mapped to an event dispatcher. The event dispatcher operates to dispatch at least one event associated with an within a distributed data grid. For example, a client event can be raised within a client context (i.e. a non-storage member), while a storage event can be raised within the context of a storage enabled member.

In accordance with an embodiment, events can be defined as a set of interfaces that correspond to the functional area in which the events are raised.

Figure 3:
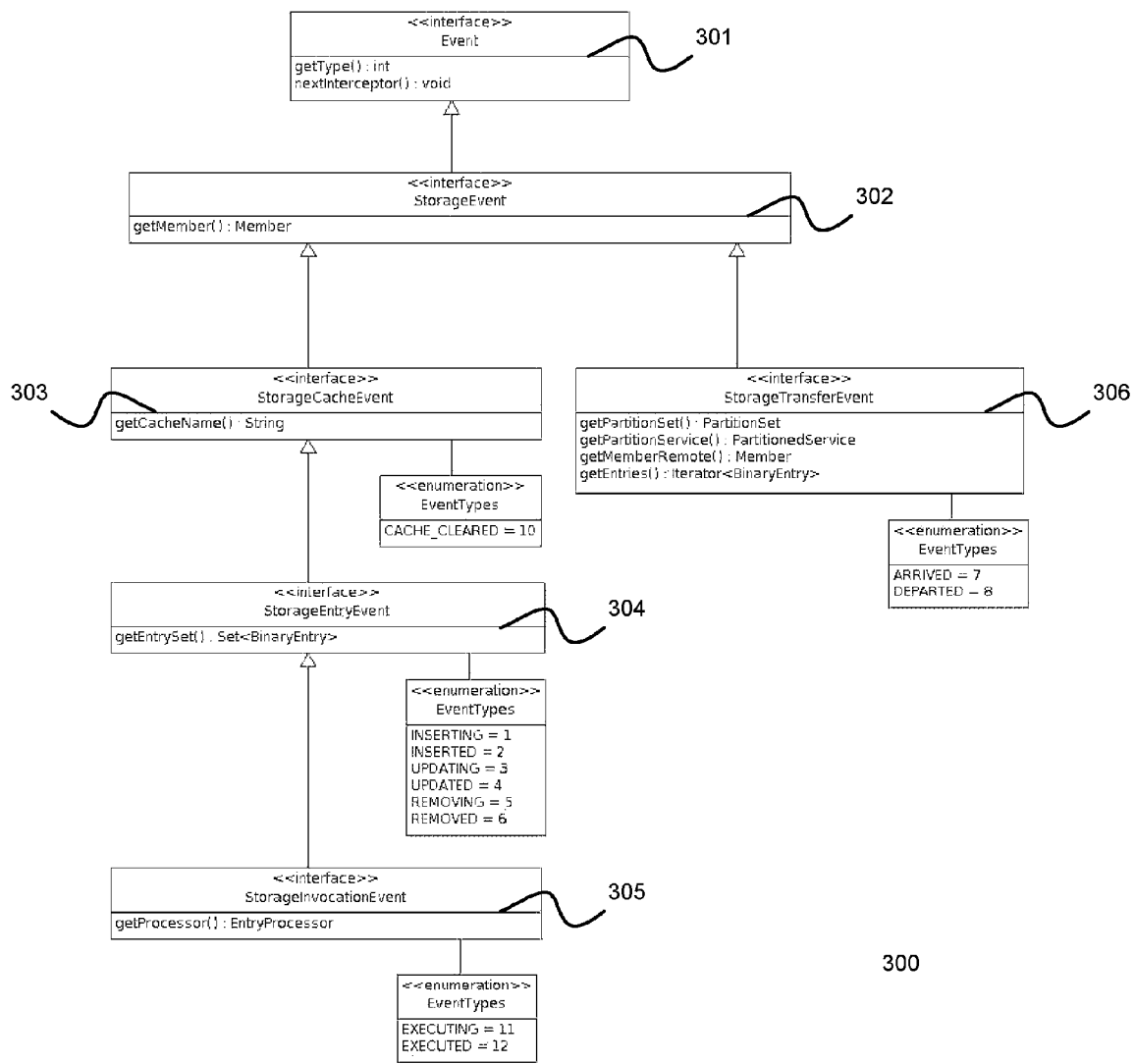
FIG. 3 shows an illustration of an event hierarchy in a server-side event model in a distributed data grid, in accordance with an embodiment of the invention.

FIG. 3 shows an illustration of an event hierarchy in a server-side event model in a distributed data grid, in accordance with an embodiment of the invention. As shown in FIG. 3, an Event interface 301 is the base of all events in the system. Every event object in the system can have one or more event type associated with it. Consumers of an Event instance can decide what action to perform based on the event type. The Listing 3 below shows a sample Event interface in Coherence.

Listing 3

```
/**
 * An {@link Event} object captures the necessary information required to adequately describe
 * the activity that has occurred.
 *
 * Note that an {@link Event} object itself is immutable and its state is only valid in the context
 * of a single chain of {@link EventInterceptor#onEvent(EventContext, Event)} calls. Holding a
 * reference to the Event outside this scope or across calls is not safe.
 *
 */
public interface Event
    {
    /**
     * Return the {@link Event}'s type
     *
     * @return the {@link Event}'s type
     */
    public int getType( );
    /**
     * Call the next {@link EventInterceptor} in the chain if one exists. After each subsequent
     * intercepter has run this method will return giving the caller the opportunity to observe any
     * side effects caused by down stream {@link EventInterceptor}s. {@link EventInterceptor}s
     * that don't call this method will not prevent the chain from being executed, they just won't
     * have the opportunity to see any side effects.
     */
    public void nextInterceptor( );
    }
```

Also as shown in FIG. 3, the event hierarchy 300 includes a StorageEvent interface 302 for a storage event. The StorageEvent interface extends from the event interface directly. Additionally, the event hierarchy includes a StorageCacheEvent interface 303, a StorageEntryEvent interface 304, StorageInvocationEvent interface 305, and a StorageTransferEvent interface 306 for different types of storage events.

Furthermore, there can be other events that are not shown in FIG. 3, such as: MemberEvents, which are events related to membership in the cluster (member joined, member left), ClusterEvents, which are events related to the entire cluster, TransactionEvents, which are events related to Coherence Transactions (start, commit, rollback), ProxyEvents, which are events related to Coherence Proxies (load balancing events, push back events), SecurityEvents, which are events related to security and auditing, AbnormalEvents, which are events that indicate some threshold of errors have occurred that require action, and ClientSideEvents, which are events that run on storage disabled members.

In accordance with an embodiment, an event instance can be immutable and its lifecycle can be controlled by the underlying system. Hence, references to event classes may not be held across multiple invocations.

Event Dispatching

In accordance with an embodiment, event dispatching involves the raising of an event for processing by event interceptors, and the calling of a chain of event interceptors when there are more than one event interceptors registered for the same event.

In accordance with an embodiment, event interceptors can be chained together and can be called serially by the thread responsible for dispatching an event. The base implementation of the event object can provide all the logic for interceptor chaining which can then be re-used for each implementation of event instance needed by the specified interfaces. Event interceptors can be executed based on the order that the event interceptors have been added to the Event Dispatcher. For example, in Coherence, the event interceptors can be added to the head or the tail via a First parameter on EventDispatcher.addInterceptor( ) method.

Figure 4:
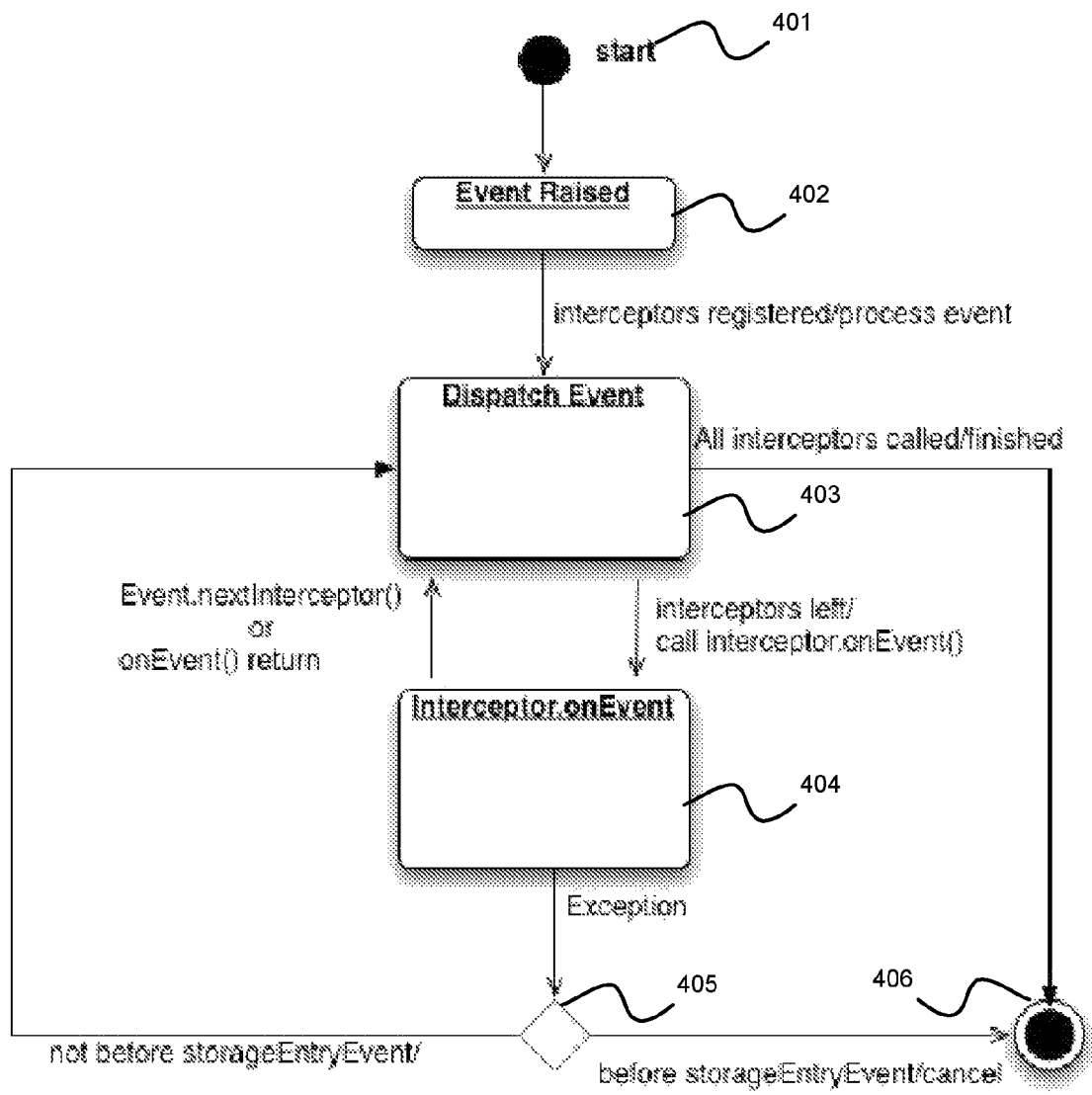
FIG. 4 shows an illustration of an event dispatching flow for a server-side event model in a distributed data grid, in accordance with an embodiment of the invention.

FIG. 4 shows an illustration of an event dispatching flow for a server-side event model in a distributed data grid, in accordance with an embodiment of the invention. As shown in FIG. 4, the event dispatching flow starts 401 when an event is raised for processing 402. The event dispatching flow includes calling a chain of event interceptors that registered for the event 403. When an event interceptor in the chain is triggered by the system, an onEvent( ) method can be executed for handling the event 404. Finally, the event dispatching flow ends when every event interceptor in the chain is called and finished 406.

Each event interceptor in the chain can optionally modify data associated with the event if the context allows it (e.g. INSERTING and UPDATING events before StorageEntryEvents). For the pre-committed storage events (e.g. UPDATING, INSERTING, REMOVING), event interceptors can veto the operation by throwing an exception 405.

Each event interceptor in the chain can optionally observe the results of any side effects caused by event interceptors running after it in the chain. If the interceptor chain is associated with a pre-committed storage event, this ability to observe the results provides a second opportunity to veto the processing.

Observing the side effects of downstream event interceptors can be accomplished via the Event.nextInterceptor( ) method. When this method returns, it signifies that all downstream event interceptors have been executed, and any changes to state associated with the Event can be inspected.

In accordance with an embodiment, the event object can hold state on the processing of the event instance in order to support the observation of downstream effects. If the event interceptor itself calls the Event.nextInterceptor( ), the event interceptor can trigger the next event interceptor in the chain to fire, with the option of taking action on the side effects including throwing an exception. If the event interceptor returns, the event itself can trigger the next event interceptor in the chain's onEvent( ) method.

Interceptor Management

In accordance with an embodiment, event interceptors can be registered with the server-side event model framework without direct knowledge about what event dispatchers are available in the system. For example, the system can support scenarios where event interceptors are registered for event dispatchers that have not yet been instantiated. If a user is interested in all storage events for a specific service before ensureCache ("cache-foo") is called, the registered event interceptors may still need to be added to the event dispatcher for "cache-foo" when it is realized. In addition, the system can selectively register event interceptors with event dispatchers. Also, the system can support flexible customizable mappings, since the criteria for selecting a dispatcher may vary across event dispatchers and dispatcher implementations.

In accordance with an embodiment, an event interceptor registry can map an event interceptor registered with the system to event dispatchers that have been registered with the system. The event interceptor registry can keep track of both the available event dispatchers and the currently registered event interceptors in order to support late runtime initialization of event dispatchers and runtime event interceptor registration. The following Listing 4 is a sample interface for the event interceptor registry.

Then, the event interceptor 505 can evaluate whether it wants to listen to events from the supplied dispatcher. If it does, then the interceptor 505 can associate itself with the dispatcher via calling EventDispatcher.addInterceptor( ) 506.

Figure 6:
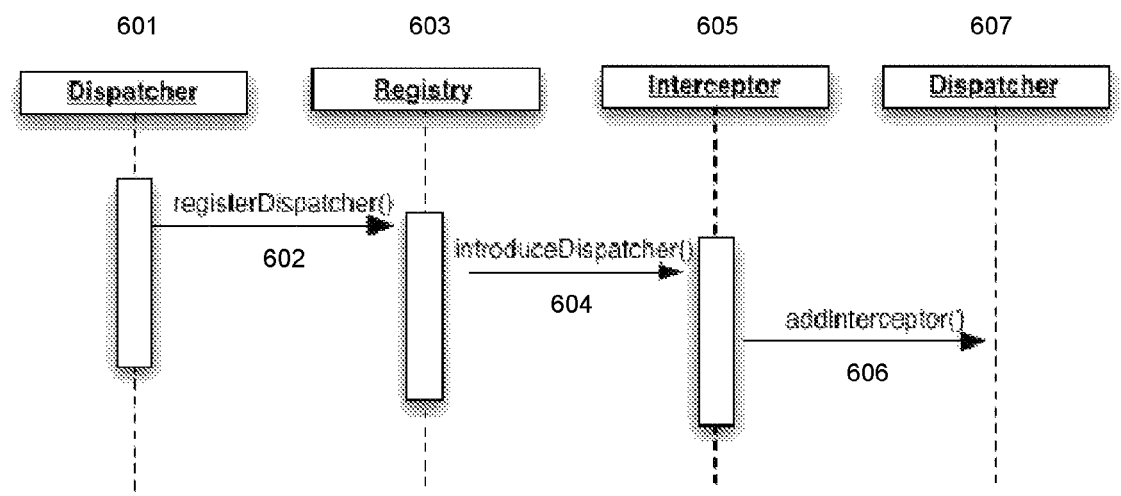
FIG. 6 shows an illustration of event interceptor registration in a distributed data grid, in accordance with an embodiment of the invention.

FIG. 6 shows an illustration of event interceptor registration in a distributed data grid comprising Client 601, Registry 603, Interceptor 605, and Dispatcher 607 in accordance with an embodiment. As shown in FIG. 6, when a new dispatcher 601 is registered 602, the registry 603 calls interceptor.introduceDispatcher(Dispatcher d) 604 for each interceptor registered. Then, the event interceptor 605 can evaluate whether it wants to listen to events from the supplied dispatcher. If it does, then the interceptor can associate itself with the dispatcher 607 via calling EventDispatcher.addInterceptor( ) 606.

In order to support programmatic configuration of server-side events, the event interceptor registry instance can be made available to the entire Coherence instance running within a JVM. With the access to the registry from anywhere in the system, the server-side events model can be extensible Listing 4

```
/**
 * An {@link EventInterceptorRegistry} is responsible for mapping {@link EventInterceptor}s to
 * appropriate {@link EventDispatchers}s.
 *
 */
public interface EventInterceptorRegistry
    {
    /**
     * Add an {@link EventInterceptor} with a unique identifier. At registration time, the {@link
     * EventInterceptor} will be conditionally added to all known {@link EventDispatchers}s. If a
     * new {@link EventDispatcher} declares itself after a {@link EventInterceptor} is registered,
     * the {@link EventInterceptor} will be conditionally added.
     *
     * @param      sIdentifier the unique name identifying the {@link EventInterceptor}
     * @param eventInterceptor   the {@link EventInterceptor} to be registered
     */
    void registerInterceptor(String sIdentifier, EventInterceptor eventInterceptor);
    /**
     * Remove an {@link EventInterceptor} from a list of known {@link EventInterceptor}s. This
     * will cause the {@link EventInterceptorRegistry} to visit all known {@link EventDispatcher}s
     * and remove any instance of the {@link EventInterceptor} living in {@link EventDispatcher}s.
     *
     * @param sIdentifier the unique identifier of the {@link EventInterceptor} to be removed
     */
    void unregisterInterceptor(String sIdentifier);
    }
```

The server-side event model framework can flexibly match event interceptors with different event dispatchers. The framework allows a handshake between the event interceptors and the event dispatchers, in order to determine whether an event dispatcher should call a given event Interceptor. This handshake can be done during registration time.

In accordance with an embodiment, the registration workflow is similar for registering a dispatcher and registering an interceptor the registration. The primary difference is whether the registry is iterating over the set of registered interceptors or the set of registered event dispatchers.

Figure 5:
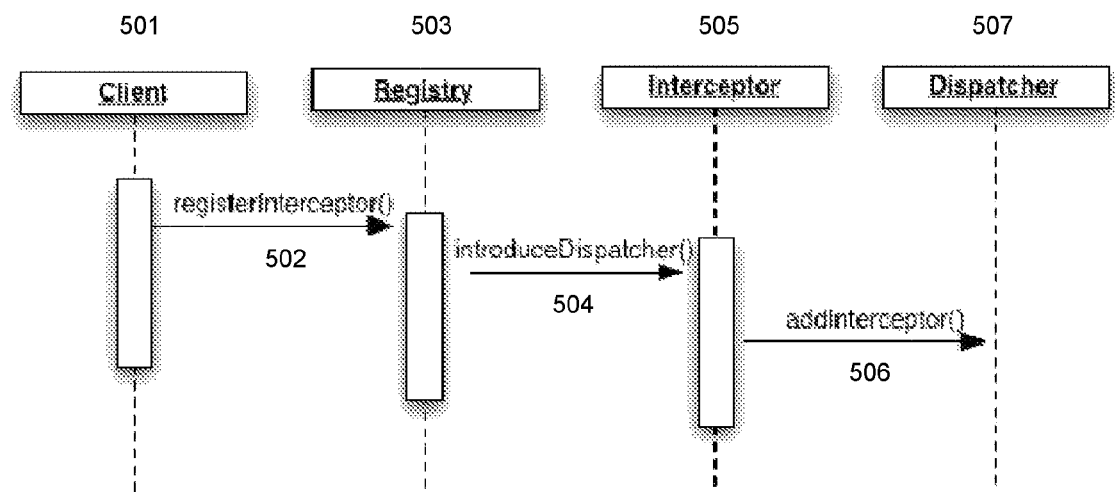
FIG. 5 shows an illustration of event interceptor registration in a distributed data grid, in accordance with an embodiment of the invention.

FIG. 5 shows an illustration of event interceptor registration in a distributed data grid comprising Client 501, Registry 503, Interceptor 505, and Dispatcher 507 in accordance with an embodiment. As shown in FIG. 5, when a new interceptor is registered 502 with the event interceptor registry 503, the registry 503 calls interceptor.introduceDispatcher(Dispatcher d) 504 for each dispatcher registered.

enough to support dynamically adding and removing dispatchers and interceptors as they are instantiated. In Coherence, different functionalities can be added to the Cluster via the registerResource/unregisterResource API. The registry can be instantiated and registered with the Cluster object before any other object or component might want access to the registry. For example, the interceptor registry can be stored under the name "com.oracle.EventInterceptorRegistry."

Supporting Classes in Coherence

In accordance with an embodiment, a distributed data grid can provide out of the box supporting classes for simple use cases of the server-side event model. For example, the Coherence data grid provides an abstract event interceptor class, a simple delegating event interceptor class, a simple event dispatcher class, and a multi-thread event dispatcher class.

The abstract event interceptor class can provide a base implementation for event interceptors to simplify the work required to build interceptors in the system. The abstract event interceptor class can provide a basic registration algorithm based on event types and service name and basic JMX metrics including: total number of events processed, average time processing an event, and longest time processing an event.

The simple delegating event interceptor class can reduce the overhead required in registering an event interceptor in the system by focusing solely on supported event types. The simple delegating event interceptor class can extend the abstract event interceptor class and can be constructed with an event interceptor, an optional service name that the event interceptor is interested in listening to, an optional cache name that the event interceptor is interested in listening to, and a set of event types the above interceptor is interested in listening to.

In accordance with an embodiment, an event dispatcher can then match the supplied interceptor with the desired event types and the implementer do not have to deal with any of the handshaking with the event dispatchers in the system.

The simple event dispatcher class is a general purpose event dispatcher that can be responsible for managing the set of interceptors and their order by type. Adding new interceptors may lead to a new copy of the interceptor lists being created, so that any events currently being processed are not impacted in the middle of processing. Furthermore, when a component wants to dispatch an event type, the simple event dispatcher can be responsible for taking the appropriate set of interceptors and asking the event to start processing them based on an interceptor chaining flow. Additionally, the simple event dispatcher can be responsible for reporting on JMX statics such as the list of registered interceptors by name in their execution order, the number of events that have been dispatched, the average time spent dispatching events, the longest time dispatching an event, and the interceptor with the longest dispatch time. Furthermore, the simple event dispatcher class can be implemented under com.tangosol.net.internal.unifiedevents.dispatchers that implements the EventDispatcher interface along with a generic implementation of DispatchEvent.

Additionally, a multi-thread event dispatcher class can extend the simple event dispatcher class and can add an extra thread to process events asynchronously. Events can be placed on a queue for processing by the internal worker thread. The worker thread is responsible for actually calling the registered interceptors while the main thread places the work on the queue. The multi-threaded event dispatcher can provide an API that allows for both dispatching events on the main thread as well as dispatching events on the worker thread.

Configuring the Server-Side Event Model

In accordance with an embodiment, the server-side event model can be programmatically configured. For example, in Coherence, an event interceptor registry can be retrieved from the Cluster via a call to Cluster.getResource("com.oracle.EventInterceptorRegistry"). Furthermore, an event interceptor can be registered in the event interceptor registry, via a call to EventInterceptorRegistry.registerInterceptor ("InterceptorName", new EventInterceptor( )).

In accordance with another embodiment, the server-side event model can be declaratively configured in a cache configuration file. The following Listing 6 is a sample cache configuration file with interceptor configuration.

Listing 6

```
<cache-config>
  <caching-scheme-mapping>
    <cache-mapping>
      <cache-name>dist-*</cache-name>
      <scheme-name>partitioned-std</scheme-name>
    </cache-mapping>
  </caching-scheme-mapping>
  <caching-schemes>
    <distributed-scheme>
      <scheme-name>partitioned-std</scheme-name>
      <service-name>Partitioned</service-name>
      <backing-map-scheme>
        <local-scheme>
          <scheme-ref>backing-map</scheme-ref>
        </local-scheme>
      </backing-map-scheme>
      <autostart>true</autostart>
    </distributed-scheme>
  </caching-schemes>
  <event-interceptors>
    <!-- interceptor that doesn't use the SimpleDelegatingEventInterceptor -->
    <interceptor>
      <name>string</interceptor-name>
      <class-scheme>string</class-scheme>
     <interceptor>
    </event-interceptor>
    <!-- interceptor that uses the SimpleDelegatingEventInterceptor
         to listen to all "trigger" related events for cache-foo on
         the service named Partitioned -->
    <interceptor>
      <name>string</interceptor-name>
      <class-scheme>string</class-scheme>
      <dispatcher-filter>
        <service-name>Partitioned</service-name>
        <cache-name>cache-foo</cache-name>
        <events>
          <event-type>
```

Listing 6

```
<class-scheme>com.tangosol.coherence.unifiedevents.StorageEntryEvent</class-scheme>
    <events>
        <name>INSERTING</name>
        <name>UPDATING</name>
        <name>REMOVING</name>
    </events>
    </event-type>
  </events>
 <dispatcher-filter>
</interceptor>
</event-interceptors->
```

As shown in the above, the Coherence namespace handler can be extended to support the new xml elements in the cache configuration file. One xml element can be an optional <event-interceptors> element, which defines the set of all interceptors to be registered in the system. Another xml element can be an optional <interceptor> element, which defines an instance of an event interceptor.

The <interceptor> element can include: a <name> attribute, which defines the name of the interceptor; a <class-scheme> attribute, which defines the name of the class that implements EventInterceptor; and a <dispatcher-filter> attribute, which defines a declarative way to filter which dispatcher an interceptor is associated with <service-name>, <cache-name>, and <events>. The <service-name> attribute defines the name of the service that must match in order to register. The <cache-name> attribute defines the name of the cache that must match in order to register. The <events> attribute defines a list of events that the interceptor wants to register for. The <event-type> attribute defines an event instance to register for. The <event-type> attribute defines an event instance to register for a <class-scheme> attribute and a <events> attribute. The <class-scheme> attribute defines the server-side event class to use like com.tangosol.coherence.unifiedevents.StorageEntryEvent, and the <events> attribute defines the list of event names to register for.

Offloading Events and Supporting Continuations

In accordance with an embodiment, in order to prevent end user code from bringing down or stalling the cluster member, the server-side event model avoids blocking the service thread associated with the partitioned service in the distributed data grid whenever possible, since the service thread is responsible for handling all incoming requests and coordinating their execution.

In the example of Coherence, an event dispatcher process on $Service can be used as the thread responsible for handling most server-side event messages. The event dispatcher process is a guarded queue based processor that typically executes end user code in the form of map listeners, which are handled on the client side except when they are explicitly declared to run on the server side. Since there is a relatively small set of functionality consumed on the server side, this thread is an ideal candidate for the server-side events model. Additionally, the event dispatcher is guarded with necessary protection. Furthermore, the event dispatcher process can be a single threaded queue processor that process events in order by key. The event handling can be done on a single thread to ensure that ordering is guaranteed.

Figure 7:
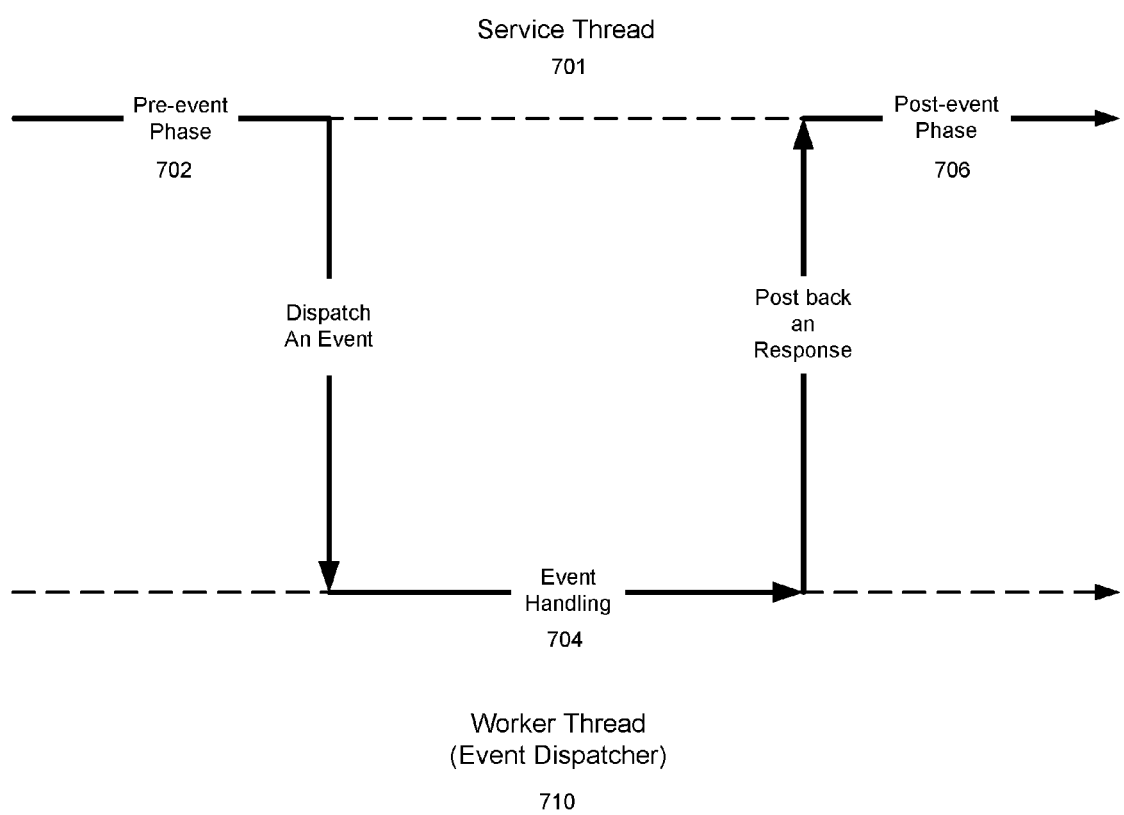
FIG. 7 shows an illustration of supporting continuation for a server-side event model in a distributed data grid, in accordance with an embodiment of the invention.

FIG. 7 shows an illustration of supporting continuation in a distributed data grid. As shown in FIG. 7, the methods that require continuations on a service thread 701 can be broken into two phases: a pre-event phase 702 and a post-event phase 706. The pre-event phase ends once the required event is dispatched to a worker thread 710 for processing. When the event dispatcher is completed with the event handling 704, the worker thread can post a response message back to the service thread which causes the request processing to continue with the post-event phase. In other words, the post-event phase continues when a response is posted back that the event has been handled.

In accordance with an embodiment, continuation support can be achieved by posting events to the event dispatcher thread. For example, the partition transfer events can support continuations. Unlike modifications to a specific Entry, partition transfers can be performed on the service thread in order to ensure that the user can lock and unlock a set of partitions from the same thread (the service thread) when dealing with continuations. Furthermore, given that partition transfer events likely leads an interceptor to iterate over an entire partition, partition transferring logic may not be executed on the service thread, in order to prevent it from being blocked for a long period of time.

In accordance with an embodiment, the post-commit events do not have the ability to disrupt the flow of request processing inside of a distributed data grid, because the entries they are provided are immutable. One requirement is that the post-commit events are executed in order by key, which can be simply achieved by offloading the event handling from the worker thread to the event dispatcher thread and moving on. Again, in Coherence, the offloading the event handling can be achieved by posting an Event object to the event dispatcher thread.

In accordance with an embodiment, all events that are dispatched on the event dispatcher can be placed on an event dispatcher queue. In Coherence, the event dispatcher runs Runnables, which are typically Serice$DispatchEvent objects. The DispatchUEMEvent object can be a specialized Service$DispatchEvent child component on PartitionedCache that contains references to: the UEMEvent object that needs to be officially dispatched, and the UEMEventDispatcher object that dispatch the events.

As shown below in Listing 7, the DispatchUEMEvent object can have child objects that are responsible for handling the particular return or continuation that's needed. The required information can be encapsulates after an event has been dispatched based on polymorphism.

Listing 7

```
public abstract class DispatchUEMEvent extends $DispatchEvent
{
    abstract void runAfter(Exception e);
```

-continued

Listing 7

```
public void run( )
{
    Exception exception = null;
    try
    {
        m_dispatcher.dispatchEvent(m_event);
    }
    catch (Exception e)
    {
        exception = e;
    }
    finally
    {
        runAfter(exception);
    }
}
/**
 * Reference to the event dispatcher to dispatch this event to
 */
protected UEMEventDispatcher m_dispatcher;
/**
 * Reference to the event to raise.
 */
protected Event    m_event;
}
```

Responses from the worker thread can be posted back to the service thread, once a specific DispatchUEM Event instance has finished executing. In the example of supporting data partition transfer, there can be two response messages that extend the basic PartitionedCache$Acknowledgement component: a PostDeparted message and a PostArrived message. A runAfter method of a DispatchTransferDeparting component can be responsible for posting a PostDeparted message back on the service thread. The DispatchTransferDeparting component extends DispatchUEMEvent and is responsible for raising the StorageTransferEvent.DEPARTING event to the UEMEventDispatcher on the Coherence EventDispatcher thread Additionally, a runAfter method of a DispatchTransferArrived component can be responsible for posting the PostArrived message back on the service thread. The DispatchTransferArrived component also extends the DispatchUEMEvent and is responsible for raising the StorageTransferEvent.ARRIVED event to the UEMEventDispatcher on the Coherence EventDispatcher thread Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for supporting event handling in a distributed data grid, said method comprising:
    providing an event model in the distributed data grid, wherein the event model operates to raise a plurality of events associated with a plurality of operations in the distributed data grid wherein said plurality of events are selected from the group consisting of StorageEvents for storage operations in the distributed data grid, and TransactionEvents for start transaction operations in the distributed data grid, commit transaction operations in the distributed data grid, and rollback transaction operations in the distributed data grid;
    providing a plurality of event interceptors which each map to one of said plurality of events by registering each event interceptor for said one of said plurality of events with a registry associated with the distributed data grid, wherein more than one of said plurality of event interceptors may be registered for each of said plurality of events;
    raising a particular event of the plurality of events in response to an associated particular operation of said plurality of operations;
    calling, with an event dispatcher, a particular one or more event interceptors of said plurality of event interceptors registered for the particular event in response to raising of said particular event;
    handling, with said particular one or more event interceptors, the particular event;
    dispatching said particular event from the event dispatcher for processing of the particular operation only after all of the particular one or more event interceptors registered for the particular event have been called by the event dispatcher;

whereby the event dispatcher defers completion of the particular operation of said plurality of operations in the distributed data grid pending completion of the handling of the particular event by the particular one or more event interceptors called by the event dispatcher.

2. The method of claim 1, further comprising:
triggering, with another event dispatcher, another particular one of said one or more event interceptors registered for another particular event of the plurality of events associated with another particular operation of the plurality of operations upon raising of said another particular event;
handling, with said another particular event interceptor, the another particular event; and
deferring completion of the another particular operation of said plurality of operations in the distributed data grid pending completion of the handling of the another particular event by the another particular event interceptor.

3. The method of claim 1, wherein said distributed data grid is an in-memory distributed data grid having a plurality of cluster nodes storing a plurality of data partitions, each of said plurality of cluster nodes being responsible for storing one or more of said plurality of data partitions in memory.

4. The method of claim 1, further comprising:
providing an interface that allows an end user to implement customized logic for handling events.

5. The method of claim 1, further comprising:
chaining multiple event interceptors together when said multiple event interceptors are registered for a same event.

6. The method of claim 1, further comprising:
chaining together multiple event interceptors when said multiple event interceptors are registered for a same event; and
executing said multiple event interceptors in an order that said multiple event interceptors are added to the event dispatcher.

7. The method of claim 1, further comprising:
executing said particular one or more event interceptors in an order that they are added to the event dispatcher.

8. The method of claim 1, further comprising:
avoiding blocking a service thread that is responsible for handling all incoming requests for operations.

9. The method of claim 1, further comprising:
allowing a pre-commit work flow to know whether the particular one or more event interceptors should move forward to a commit phase of processing.

10. The method of claim 1, further comprising:
supporting continuation by posting events to the event dispatcher.

11. A system for supporting event handling, said system comprising:
a distributed data grid having a plurality of cluster nodes storing a plurality of data partitions, each of said plurality of cluster nodes having one or more microprocessor and memory storing a subset of said plurality of data partitions;
a registry associated with the distributed data grid;
an event model which operates to raise a plurality of events associated with a plurality of operations in the distributed data grid wherein said plurality of events are selected from the group consisting of StorageEvents for storage operations in the distributed data grid, and TransactionEvents for start transaction operations in the distributed data grid, commit transaction operations in the distributed data grid, and rollback transaction operations in the distributed data grid;
a plurality of event interceptors wherein each of the plurality of event interceptors is mapped to one of said plurality of events by being registered for said one of said plurality of events with said registry associated with the distributed data grid and wherein more than one of said plurality of event interceptors may be registered for each of said plurality of events;
an event dispatcher configured to call a particular one or more of said plurality of event interceptors registered for a particular event of the plurality of events associated with a particular operation of the plurality of operations upon raising of said particular event by said event model;
wherein said particular one or more event interceptors are configured to handle the particular event; and
wherein the event dispatcher is configured to dispatch said particular event for processing of the particular operation only after all of the particular one or more event interceptors registered for the particular event have been called by the event dispatcher whereby the event dispatcher is configured to defer completion of the particular operation associated with the particular event pending completion of the handling of the particular event by the particular one or more event interceptors called by the event dispatcher.

12. The system of claim 11, wherein:
a particular two or more event interceptors are registered for the particular event associated with the particular operation and raised by the event model, wherein each of the particular two or more event interceptors is configured to handle the particular event, wherein handling the particular event includes one of canceling or modifying said particular operation associated with said particular event;
wherein the event dispatcher is configured to call all of the particular two or more event interceptors registered for the particular event upon raising of said particular event by said event model; and
wherein the event dispatcher is configured to dispatch said particular event for processing of the particular operation only after all of the particular two or more event interceptors registered for the particular event have been called by the event dispatcher whereby the event dispatcher is configured to defer completion of the particular operation associated with the particular event pending completion of the handling of the particular event by the particular two or more event interceptors called by the event dispatcher.

13. The system of claim 11, wherein handling the particular event includes one of canceling or modifying said particular operation associated with said particular event.

14. The system of claim 11, further comprising:
an interface that allows an end user to implement customized logic for handling events.

15. The system of claim 11, wherein:
a particular two or more event interceptors are registered for the particular event associated with the particular operation and raised by the event model, wherein each of the particular two or more event interceptors is configured to handle the particular event, wherein handling the particular event includes one of canceling or modifying said particular operation associated with said particular event;

wherein the event dispatcher is configured to chain together the two or more event interceptors registered for the particular event;

wherein the event dispatcher is configured to call all of the chained particular two or more event interceptors registered for the particular event upon raising of said particular event by said event model; and wherein the event dispatcher is configured to dispatch said particular event for processing of the particular operation only after all of the chained particular two or more event interceptors registered for the particular event have been called by the event dispatcher whereby the event dispatcher is configured to defer completion of the particular operation associated with the particular event pending completion of the handling of the particular event by the particular two or more event interceptors called by the event dispatcher.

16. The system of claim 11, wherein:

a particular three or more event interceptors are registered for the particular event associated with the particular operation and raised by the event model, wherein each of the particular three or more event interceptors is configured to handle the particular event, wherein handling the particular event includes one of canceling or modifying said particular operation associated with said particular event;

wherein the event dispatcher is configured to chain together the three or more event interceptors registered for the particular event in an order that they were added to the event dispatcher;

wherein the event dispatcher is configured to call all of the chained particular three or more event interceptors registered for the particular event upon raising of said particular event by said event model in an order that they were added to the event dispatcher; and wherein the event dispatcher is configured to dispatch said particular event for processing of the particular operation only after all of the chained particular three or more event interceptors registered for the particular event have been called by the event dispatcher whereby the event dispatcher is configured to defer completion of the particular operation associated with the particular event pending completion of the handling of the particular event by the particular three or more event interceptors called by the event dispatcher.

17. The system of claim 11, wherein:

a particular first and second event interceptors are registered for the particular event associated with the particular operation and raised by the event model, wherein each of the particular first and second event interceptors is configured to handle the particular event, wherein handling the particular event includes one of canceling or modifying said particular operation associated with said particular event;

wherein the event dispatcher is configured to call the particular first event interceptor followed by the particular second event interceptor upon raising of said particular event by said event model;

wherein the particular first event interceptor is configured to observe effects caused by the particular second event interceptor; and wherein the event dispatcher is configured to dispatch said particular event for processing of the particular operation only after both of the particular first event interceptor and particular second event interceptor registered for the particular event have been called by the event dispatcher whereby the event dispatcher is configured to defer completion of the particular operation associated with the particular event pending completion of the handling of the particular event by the particular first event interceptor and particular second event interceptor called by the event dispatcher.

18. The system of claim 11, wherein:

a particular event object is configured to hold a state of processing of the particular event;

a particular first event interceptor and a particular second event interceptor are registered for the particular event associated with the particular operation and raised by the event model, wherein each of the particular first event interceptor and particular second event interceptor is configured to handle the particular event, wherein handling the particular event includes one of canceling or modifying said particular operation associated with said particular event;

wherein the event dispatcher is configured to call the particular first event interceptor followed by the particular second event interceptor upon raising of said particular event by said event model;

wherein the particular first event interceptor is configured to observe effects caused by the particular second event interceptor using the particular event object; and wherein the event dispatcher is configured to dispatch said particular event for processing of the particular operation only after both of the particular first event interceptor and particular second event interceptor have been called by the event dispatcher whereby the event dispatcher is configured to defer completion of the particular operation associated with the particular event pending completion of the handling of the particular event by the particular first event interceptor and particular second event interceptor called by the event dispatcher.

19. The system of claim 11, wherein:

the distributed data grid allows a pre-commit work flow to know whether the event interceptors should move forward to a commit phase of request processing.

20. A non-transitory computer readable memory storing instructions thereon for supporting event handling in a distributed data grid, which instructions when executed, cause said distributed data grid to perform steps comprising:

providing an event model, wherein the event model operates to raise a plurality of events associated with a plurality of operations in the distributed data grid wherein said plurality of events are selected from the group consisting of StorageEvents for storage operations in the distributed data grid, and TransactionEvents for start transaction operations in the distributed data grid, commit transaction operations in the distributed data grid, and rollback transaction operations in the distributed data grid;

providing a plurality of event interceptors which each map to one of said plurality of events by registering each event interceptors for said one of said plurality of events with a registry associated with the distributed data grid, wherein more than one of said plurality of event interceptors may be registered for each of said plurality of events;

raising a particular event of the plurality of events in response to an associated particular operation of said plurality of operations;

calling, with an event dispatcher, a particular one or more event interceptors of said plurality of event interceptors registered for the particular event in response to raising of said particular event;

handling, with said particular one more event interceptors, the particular event; and dispatching said particular event from the event dispatcher for processing of the particular operation only after all of the particular one or more event interceptors registered for the particular event have been called by the event dispatcher whereby the event dispatcher defers completion of the particular operation of said plurality of operations in the distributed data grid pending completion of the handling of the particular event by the particular one or more event interceptors called by the event dispatcher.

\* \* \* \* \*

UNITED STATES PATENT AND TRADEMARK OFFICE
CERTIFICATE OF CORRECTION

PATENT NO. : 9,602,339 B2
APPLICATION NO. : 15/132857
DATED : March 21, 2017
INVENTOR(S) : Oliver et al.

It is certified that error appears in the above-identified patent and that said Letters Patent is hereby corrected as shown below:

On the Title Page

On page 2, Column 2, under Other Publications, Line 5, delete "Actioin" and insert -- Action --, therefor.

On page 2, Column 2, under Other Publications, Line 11, delete "Bsaed" and insert -- Based --, therefor.

In the Specification

In Column 7, Line 24, delete "down stream" and insert -- downstream --, therefor.

In Column 7, Line 66, delete "First" and insert -- fFirst --, therefor.

In Column 13, Lines 3-4, delete "class- scheme" and insert -- class-scheme --, therefor.

In Column 14, Line 50, delete "Serice$DispatchEvent" and insert -- Service$DispatchEvent --, therefor.

In Column 15, Line 39, after "thread" insert -- . --.

In Column 15, Line 46, after "thread" insert -- . --.

Signed and Sealed this
Twelfth Day of September, 2017

Joseph Matal
*Performing the Functions and Duties of the
Under Secretary of Commerce for Intellectual Property and
Director of the United States Patent and Trademark Office*